United States Patent [19]

Fujiwara et al.

[11] Patent Number: 5,400,085
[45] Date of Patent: Mar. 21, 1995

[54] CHROMA NOISE REDUCTION DEVICE

[75] Inventors: Takashi Fujiwara, Urayasu; Youji Miyasako, Yokohama, both of Japan

[73] Assignee: Kabushiki Kaisha Toshiba, Kawasaki, Japan

[21] Appl. No.: 254,557

[22] Filed: Jun. 6, 1994

[30] Foreign Application Priority Data

Jun. 30, 1993 [JP] Japan .................................. 5-160676

[51] Int. Cl.$^6$ ............................................. H04N 9/64
[52] U.S. Cl. ................................... 348/624; 348/621; 348/630
[58] Field of Search ............... 348/621, 624, 630, 618, 348/607; H04N 9/64

[56] References Cited

U.S. PATENT DOCUMENTS

| | | | |
|---|---|---|---|
| 4,701,787 | 10/1987 | Fujiwara | 348/624 |
| 4,703,343 | 10/1987 | Honjo | 348/624 |
| 4,979,025 | 12/1990 | Ichinoi | 348/630 |
| 5,177,600 | 1/1993 | Monta et al. | 348/630 X |

FOREIGN PATENT DOCUMENTS 4-150394  5/1992  Japan .......................... H04N 9/64

*Primary Examiner*—Victor R. Kostak
*Attorney, Agent, or Firm*—Oblon, Spivak, McClelland, Maier, & Neustadt

[57] ABSTRACT

A chroma noise reduction device comprises an 1H delay element, first and second variable delay units, variable amplifier, first and second adder amplitude restricting circuit, first and second subtracters and first, second and third phase detectors. The first phase detector compares the phases of a delay signal of a second variable delay unit and chroma signal supplied to the second variable delay unit and controls the second variable delay circuit to have the phase of the delay signal 90°-delayed relative to the chroma signal. The second phase detector compares the phases of the delay signal and output signal of the variable amplifier and controls the phase of the first variable delay unit in response to a result of comparison. The third phase detector compares the phases of a sum signal of the delay signal and output signal of the variable amplifier and a difference signal of the delay signal and output signal of variable amplifier and controls the amplitude of the variable amplifier.

19 Claims, 11 Drawing Sheets

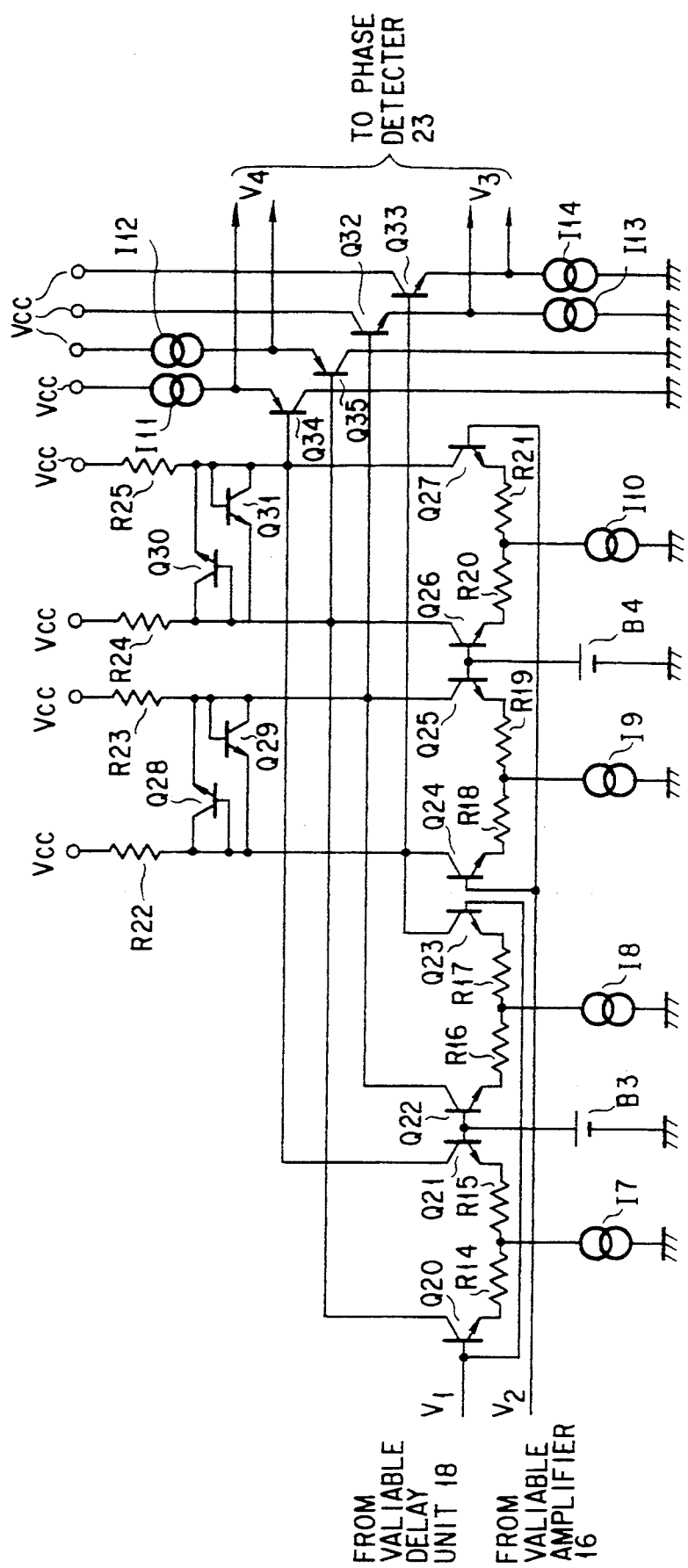
F I G. 9

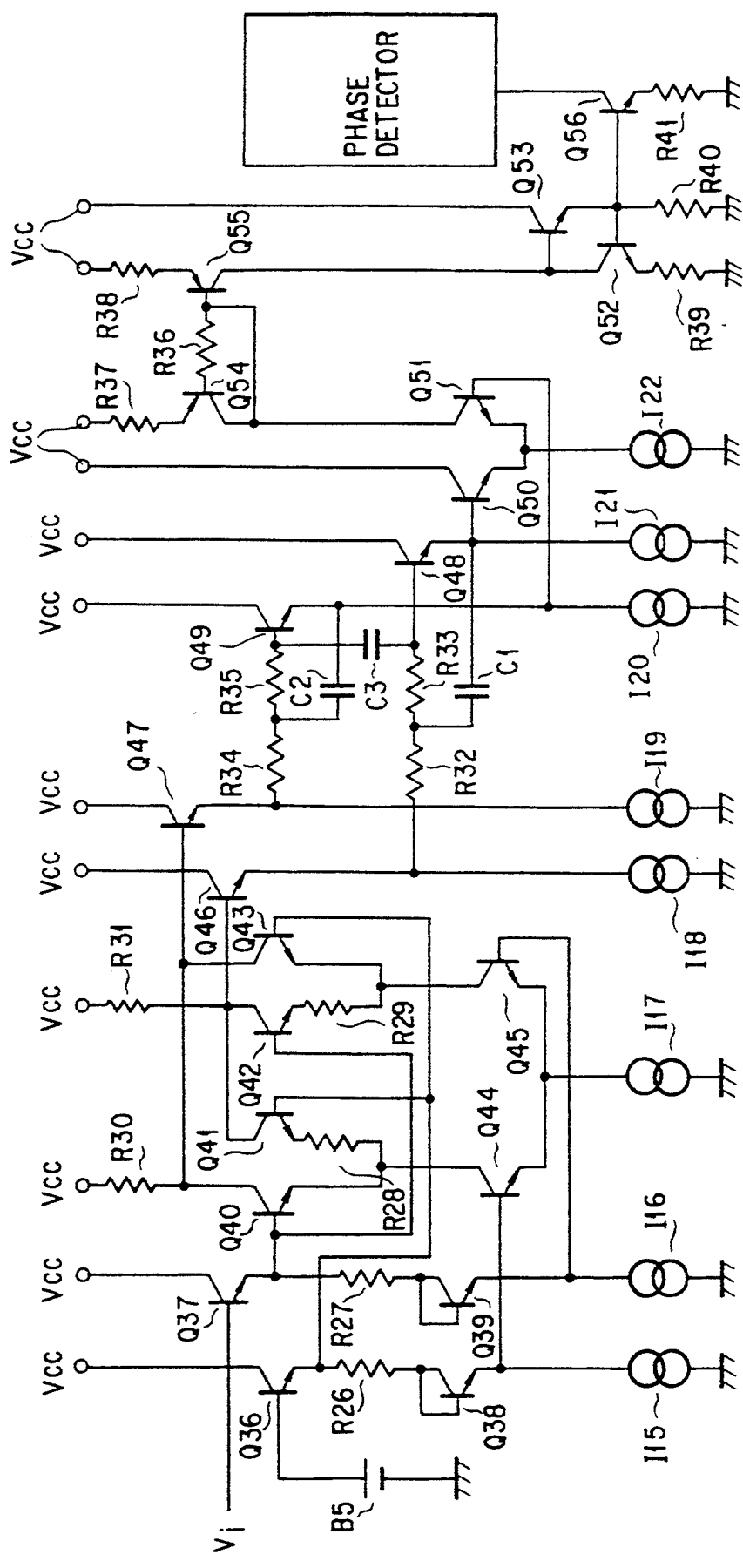
F I G. 16

CHROMA NOISE REDUCTION DEVICE

BACKGROUND OF THE INVENTION

1. Field of the Invention

The present invention relates to a chroma noise reduction device for eliminating noise components from a chroma signal of a television, VTR, etc., and, in more particular, a chroma noise reduction device for automatically adjusting the phase and amplitude of a delay signal obtained from an 1H delay element, such as a CDD, etc.

2. Description of the Related Art

Conventionally, a chroma noise reduction device for television, VTR, etc., is as shown, for example, in FIG. 1. In FIG. 1, a chroma signal vi supplied from a final stage of a chroma circuit is fed to one input terminal of each of a subtracter 11 and adder 12. The output of the subtracter 11 is supplied to a CCD 13 serving as a 1H delay circuit for delaying the signal by a 1 horizontal period. The 1H delay signal from CCD 13 is supplied to a variable amplifier 16 through a filter circuit 14 and variable delay unit 15, the filter circuit 14 being used to delay a clock signal, etc., contained in the output signal of CCD 13. An output signal $V_2$ of the variable amplifier 16 is fed back to the other input terminal of the adder 12. The adder 12 adds together the input signal $V_i$ and one horizontal period-prior signal $V_2$ which is output from the variable amplifier 16. A result of addition is supplied to the other input terminal of the subtracter 11 through a limiter 17 for amplitude limitation. The output signal of the limiter 17 is subtracted from the input signal $V_i$ by virtue of the subtracter and the output signal $V_0$ is supplied to an YC addition circuit, not shown, and to CCD 13.

CCD 13, filter circuit 14, variable delay unit 15 and variable amplifier 16 constitute external component parts. The variable delay unit 15 and variable amplifier 16 are manually adjustable, by an operation of a volume, at the phase and amplitude of the 1H delay signal.

In the arrangement above, it is necessary that, in order to obtain a desired characteristic, exact matching be achieved in amplitude and phase between the input signal $V_i$ and the 1H delay signal. Conventionally, the phase delay time of the variable delay unit 15 and amplitude of the variable amplifier 16 had been adjusted while monitoring the output signal of the adder 12.

In the chroma noise reduction device thus arranged, however, more external component parts and more manufacturing steps and more occupation areas are required upon the manufacture of a printed circuit board, etc. Further, the manufacturing cost is also higher. Since, during the portion of the manufacturing process, the operator has to manually adjust the variable delay unit 15 and variable amplifier 16 while monitoring the output signal of the adder 12, it becomes cumbersome to make adjustment and a high cost results from this viewpoint. In addition, the phase delay time of the variable delay unit 15 and amplitude of the variable amplifier 16 are also fixed after adjustment has been achieved, making it difficult to cope with a time variation and aging.

SUMMARY OF THE INVENTION

It is accordingly the object of the present invention to provide a chroma noise reduction device which can reduce a manufacturing cost and cope with a temperature variation and aging.

The object of the present invention is to provide a chroma noise reduction device, comprising:
- a 1H delay element for delaying a signal by an amount corresponding to one horizontal period;
- a first variable delay unit for adjusting the phases of a delay signal from the 1H delay element and input signal;
- a variable amplifier for adjusting the amplitude of the delay signal from the 1H delay element to the amplitude of the input signal;
- a first adder for adding the output signal of the variable amplifier and input signal;
- an amplitude restricting circuit for restricting the amplitude of an output signal of the first adder;
- a first subtracter for subtracting an output signal of the amplitude restricting circuit from the input signal and for supplying a subtraction signal to the 1H delay element;
- a second variable delay unit for 90°-delaying the phase of the input signal;
- a first phase detector for comparing the phases of the delay signal output from the second variable delay unit and input signal and for controlling the second variable delay unit in response to a comparison output to make the phase of the input signal 90°-delayed;
- a second phase detector for comparing the phases of the output signal of the second variable delay unit and output signal of the variable amplifier and for controlling a phase delay by the first variable delay unit in response to a resultant comparison output to make the output signal of the second variable delay unit 90°-delayed relative to the phase of the output signal of the variable amplifier;
- a second adder for adding the output signal of the second variable delay unit and output signal of the variable amplifier;
- a second subtracter for subtracting the output signal of the variable amplifier from the output signal of the second variable delay unit; and
- a third phase detector for comparing the phases of an addition signal output from the second adder and subtraction signal output from the second subtracter and for controlling the variable amplifier in response to a resultant comparison output.

In the arrangement above, it is possible to reduce the number of requisite external component parts by incorporating, as an IC unit, first and second variable delay units, variable amplifier, first and second adders, amplitude restricting circuit, first and second subtracters and first, second and third phase detectors. It is, therefore, possible to reduce the manufacturing steps of a device at the mounting of a printed circuit board, etc., and reduce an occupation area and to lower the manufacturing cost. Further, the phase delay time of the first variable delay unit, as well as the amplitude of the output signal of the variable amplifier, can be automatically adjusted and it is possible to obviate the need to make adjustment by the operator and can lower the manufacturing costs. It is also possible to adjust the phase delay time of the first variable delay unit, as well as the variable amplifier, continuously during the operation of the apparatus and hence to adjust the apparatus in an optimal state even if there occur a temperature variation and aging.

The above-mentioned object of the present invention can be achieved by a chroma noise reduction device comprising:

- a 1H delay element for delaying a signal by an amount corresponding to one horizontal period;
- a filter circuit for eliminating a signal component other than an input signal contained in an output signal of the 1H delay element;
- a first variable delay unit for adjusting a phase difference between a delay signal output from the filter circuit and the input signal;
- a variable amplifier for adjusting an amplitude of the delay signal of the 1H delay element to the amplitude of the input signal;
- a first adder for adding the output signal of the variable amplifier and input signal;
- an amplitude restricting circuit for restricting the amplitude of the output signal of the first adder;
- a first subtracter for subtracting an output signal of the amplitude restricting circuit from the input signal and for supplying a resultant subtraction signal to the 1H delay element;
- a second variable delay unit for 90°-delaying the phase of the input signal;
- a first phase detector for comparing the phases of the delay signal output from the second variable delay unit and input signal and for controlling the second variable delay unit in response to a comparison output to make the phase of the input signal 90°-delayed and controlling the filter circuit;
- a second phase detector for comparing the phases of the output signal of the second variable delay unit and output signal of the variable amplifier and for controlling the phase delay by the first variable delay unit in response to a resultant comparison output to make the output signal of the second variable delay unit 90°-delayed relative to the phase of the output signal of the variable amplifier;
- a second adder for adding the output signal of the second variable delay unit and output signal of the variable amplifier;
- a second subtracter for subtracting the output signal of the variable amplifier from the output signal of the second variable delay unit; and
- a third phase detector for comparing the phases of an addition signal output form the second adder and subtraction signal output from the second subtracter and for controlling the variable amplifier in response to a comparison output.

Even the above-mentioned arrangement can obtain advantages similar to those of the preceding apparatus. Further, since the filter circuit is controlled by an output signal of the first phase detector, it is possible to correct a variation among those IC versions of the filter circuits and to obtain stabilized characteristics.

Another object of the present invention can also be achieved by the chroma noise reduction device, comprising:

- a 1H delay element for delaying a signal by an amount corresponding to one horizontal period;
- a first variable delay unit for adjusting the phases of a delay signal from the 1H delay element and input signal;
- a variable amplifier for adjusting the amplitude of the delay signal from the 1H delay element to the amplitude of the input signal;
- a first adder for adding the output signal of the variable amplifier and input signal;
- an amplitude restricting circuit for restricting the amplitude of an output signal of the first adder;
- a first subtracter for subtracting an output signal of the amplitude restricting circuit from the input signal and for supplying a subtraction signal to the 1H delay element;
- a second variable delay unit for 90°-delaying the phase of the input signal;
- a first phase detector for comparing the phases of the delay signal output from the second variable delay unit and input signal and for controlling the second variable delay unit in response to a comparison output to make the phase of the input signal 90°-delayed;
- a second phase detector for comparing the phases of the output signal of the second variable delay unit and output signal of the variable amplifier and for controlling a phase delay by the first variable delay unit in response to a resultant comparison output to make the output signal of the second variable delay unit 90°-delayed relative to the phase of the output signal of the variable amplifier;
- a second adder for adding the output signal of the second variable delay unit and output signal of the variable amplifier;
- a second subtracter for subtracting the output signal of the variable amplifier from the output signal of the second variable delay unit;
- a third phase detector for comparing the phases of an addition signal output from the second adder and subtraction signal output from the second subtracter and for controlling the variable amplifier in response to a resultant comparison output; and
- a detection current control circuit for receiving the input signal and for controlling the first, second and third phase detectors.

Even the above-mentioned arrangement can obtain advantages basically the same as those of the preceding apparatus. Further, the detection current control circuit is added to the apparatus and the first, second and third phase detectors can be controlled by the output signal of the detection current control circuit. It is, therefore, possible to achieve high precision by reducing errors in the first, second and third phase detectors resulting from a chroma signal level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a circuit showing a schematic form of an adder and subtracter in FIG. 2;

FIG. 16 is a circuit arrangement showing a detection current control circuit in FIG. 15;

DETAILED DESCRIPTION OF THE PREFERRED EMBODIMENTS

Figure 2:
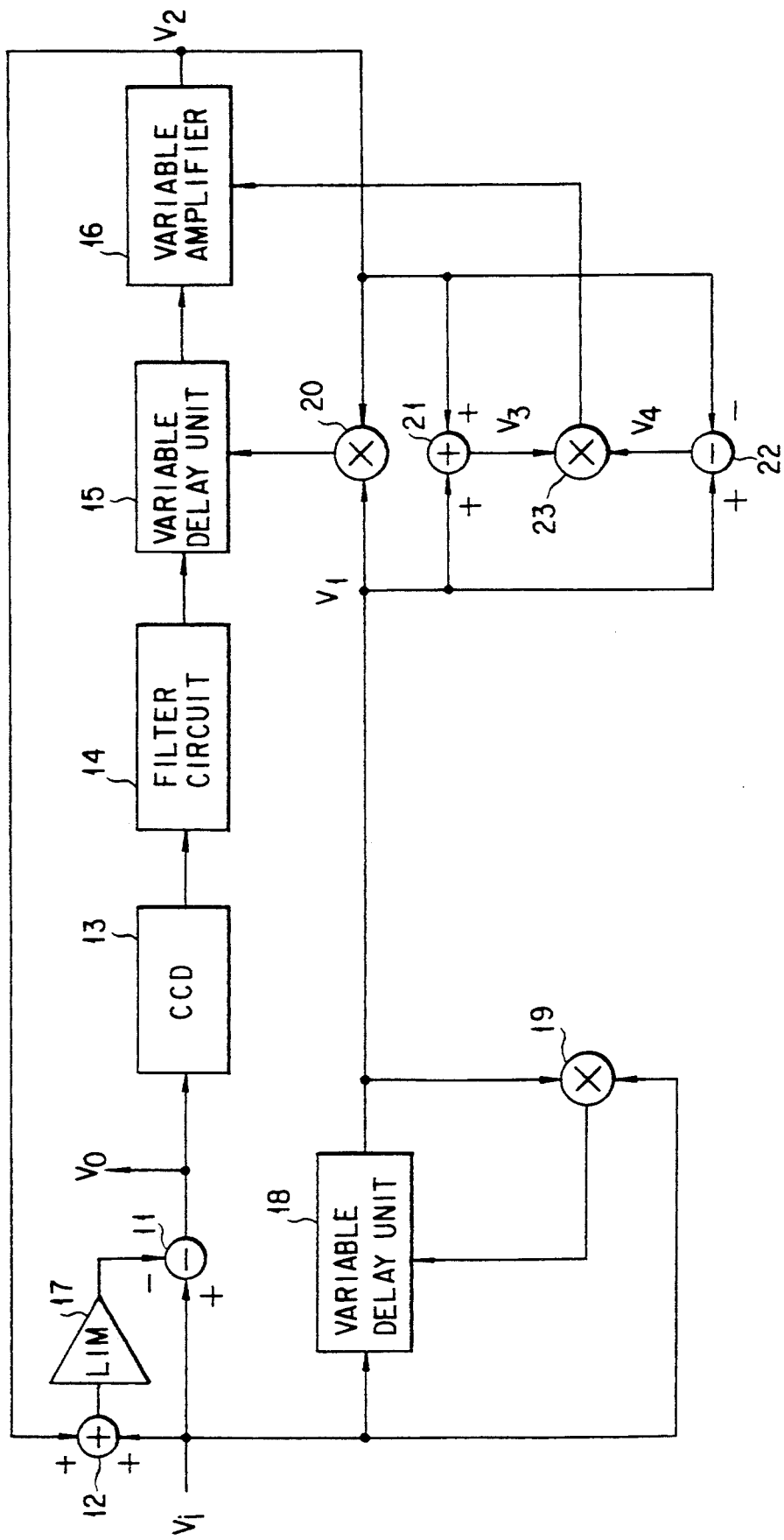
FIG. 2 is a block diagram showing a chroma noise reduction device according to a first embodiment of the present invention.
Figure 3:
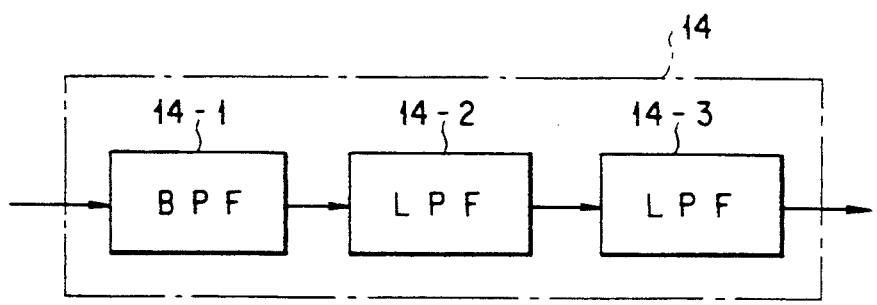
FIG. 3 is a block diagram showing a schematic form of a filter circuit in an arrangement shown in FIG. 2.
Figure 4:
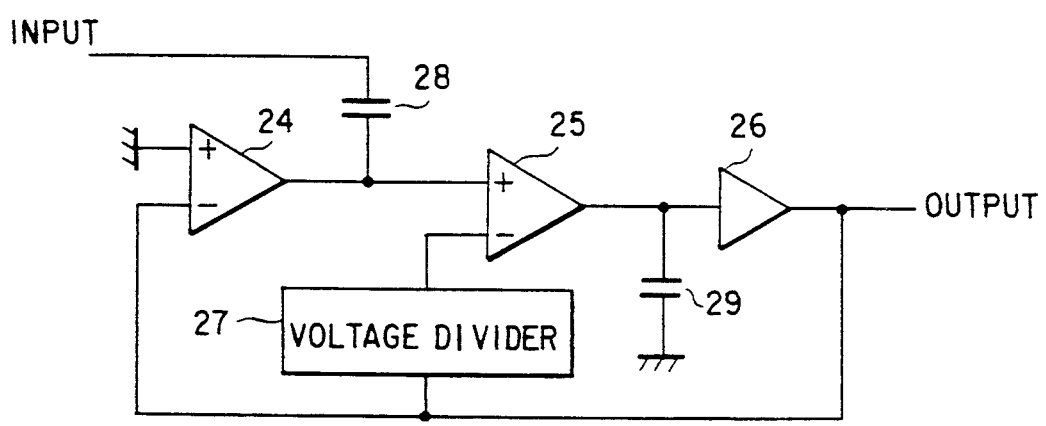
FIG. 4 shows a circuit illustrating a schematic form of a bandpass filter in FIG. 3.
Figure 5:
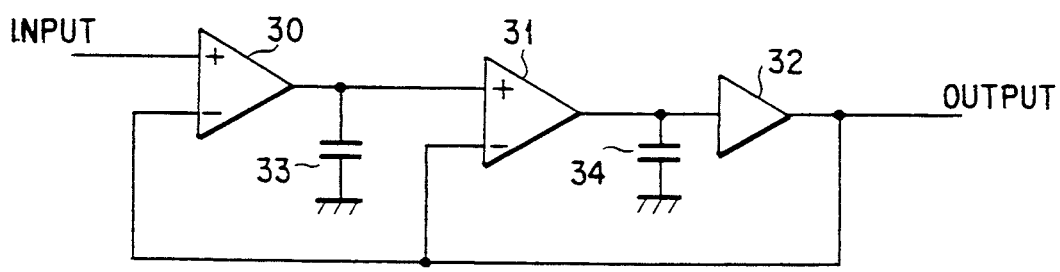
FIG. 5 shows a circuit illustrating a schematic form of a low-pass filter in FIG. 3.
Figure 6:
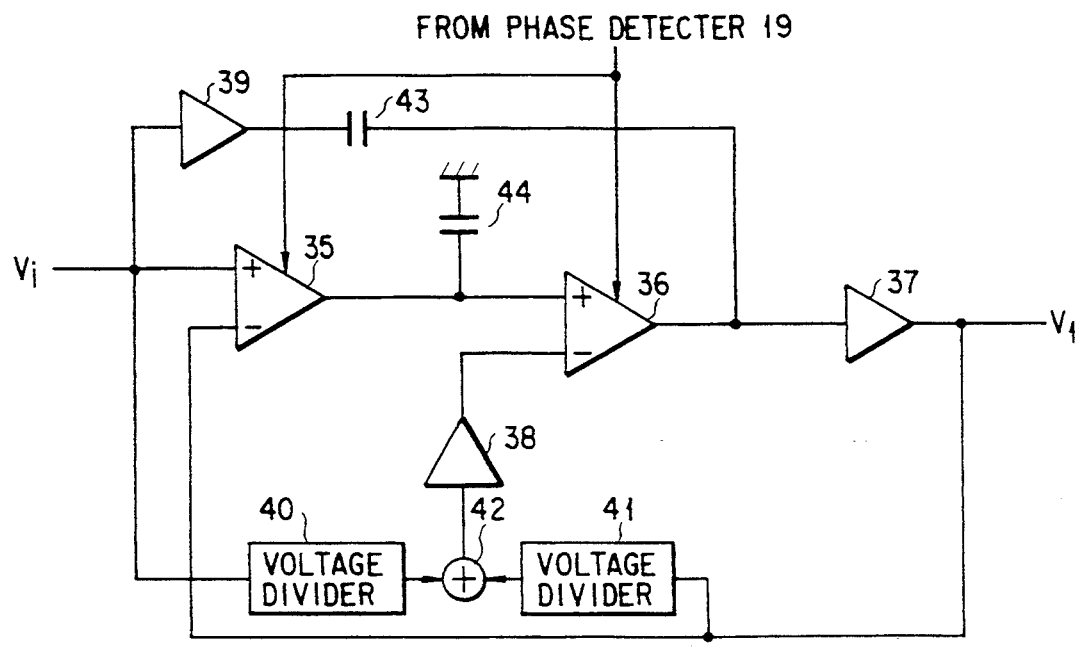
FIG. 6 is a block diagram showing a schematic form of a variable delay in FIG. 2.
Figure 7:
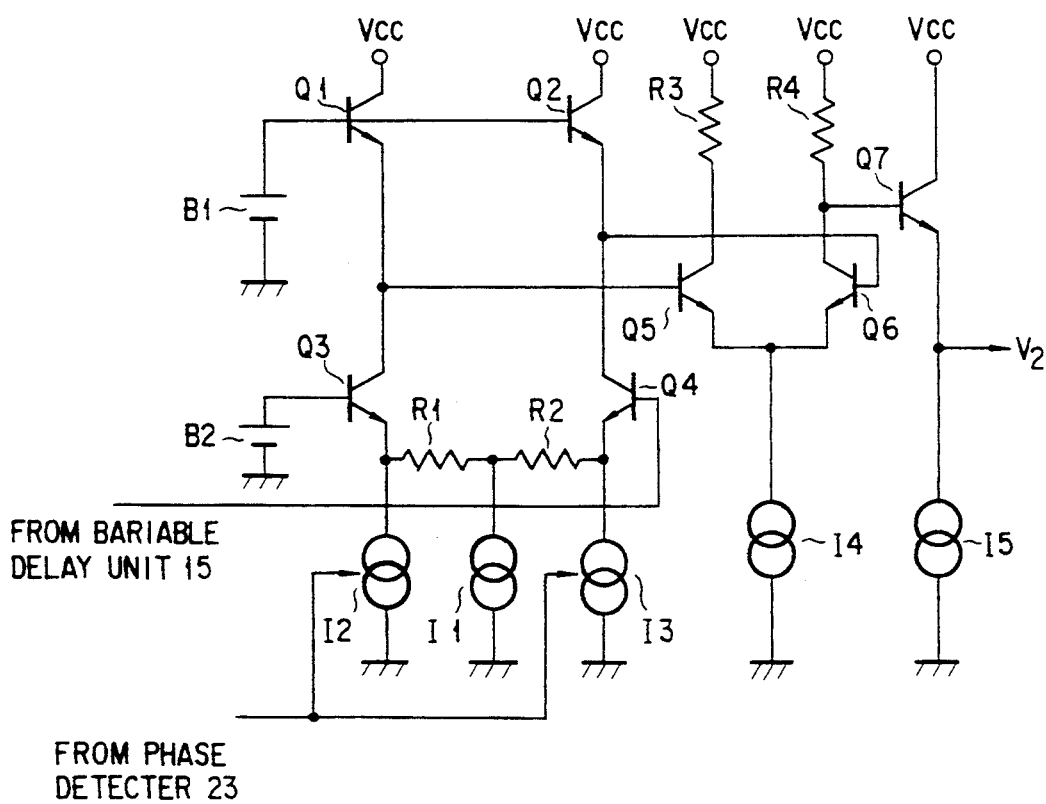
FIG. 7 is a circuit showing a schematic form of a variable amplifier in FIG. 2.
Figure 8:
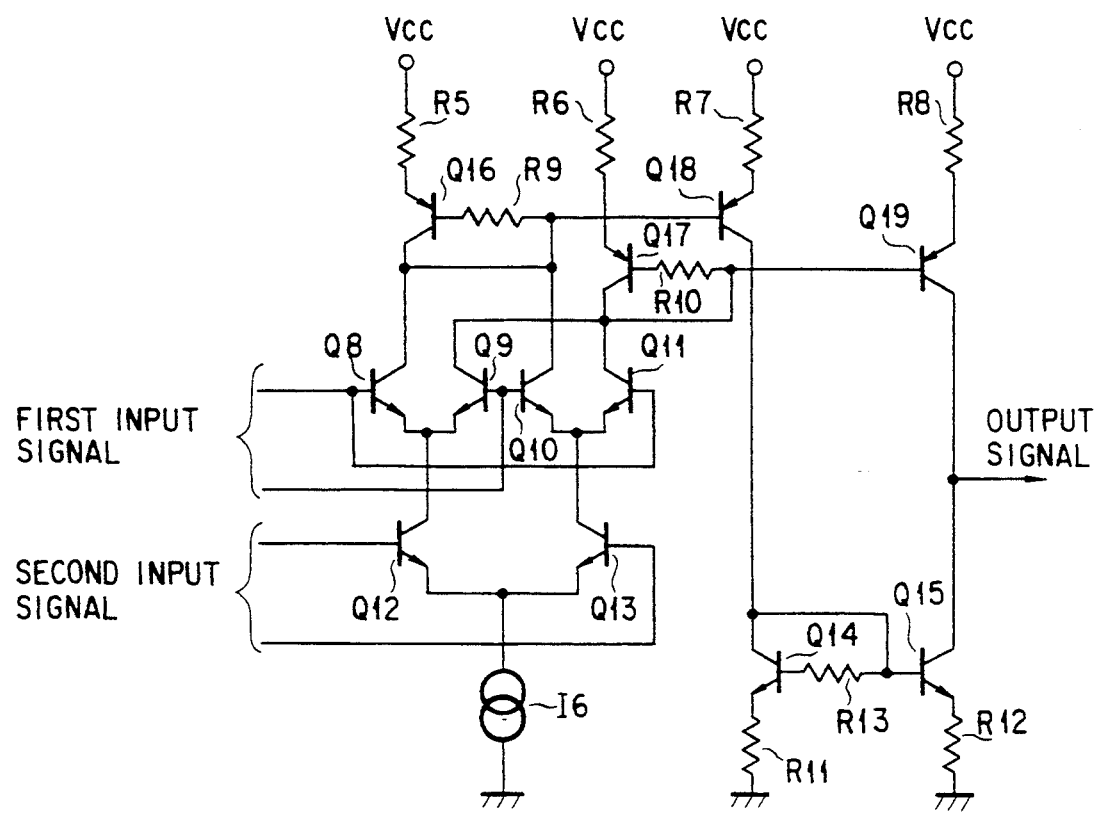
FIG. 8 is a circuit showing a schematic form of a phase detector in FIG. 2.

FIGS. 2 to 11 are views for explaining a chroma noise reduction device according to one embodiment of the present invention. Of these Figures, FIG. 2 is a block diagram showing a schematic arrangement of the device; FIG. 3 is a block diagram showing a practical form of a filter circuit in FIG. 2; FIG. 4 is a block diagram showing a bandpass filter in FIG. 3; FIG. 5 is a block diagram showing a practical form of a low-pass filter in FIG. 3; FIG. 6 is a block diagram showing a practical form of a variable delay unit in FIG. 2; FIG. 7 is a circuit diagram showing a practical form of a variable amplifier in FIG. 2; FIG. 8 is a circuit diagram showing a practical form of a phase detector in FIG. 2; FIG. 9 is a practical form of an adder and of a subtracter in FIG. 2; and FIGS. 10 and 11, each, show a vectrial diagram showing phase control and amplitude control in the apparatus shown in FIG. 2.

Figure 1:
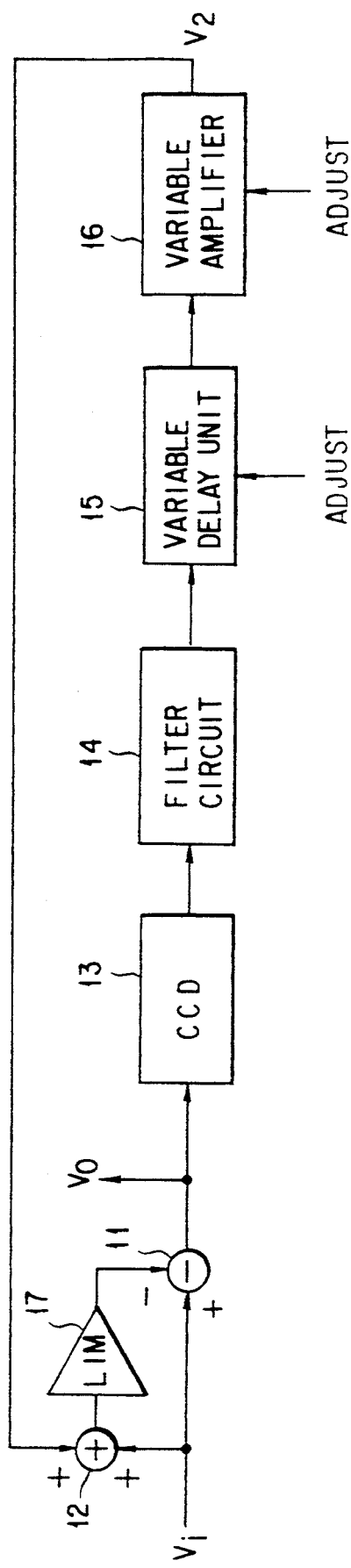
FIG. 1 is a block diagram showing a conventional chroma noise reduction device.

In FIG. 2, the same reference numerals are employed to designate parts or components corresponding to those shown in FIG. 1. A chroma signal $V_i$ is supplied to one input terminal of each of a subtracter 11 and adder 12 and an output signal of the subtracter 11 is supplied to a CCD 13. A 1H delay circuit from CCD 13 is supplied to a variable amplifier 16 through a filter circuit 14 and variable delay unit 15. An output signal $V_2$ of the variable amplifier 16 is fed back to the other input terminal of the adder 12 where the input signal $V_i$ and one horizontal period-prior signal are added together. A resultant sum signal is supplied via a limiter 17 to the other input terminal of the subtracter 11. An output signal of the limiter 17 is subtracted from the input signal $V_i$ to produce a signal $V_0$. The output $V_0$ is supplied to a YC adding circuit, not shown, and to CCD 13.

Figure 10:
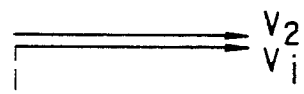
FIG. 10 is a phase control vectrial diagram in the circuit shown in FIG. 2.
Figure 11:
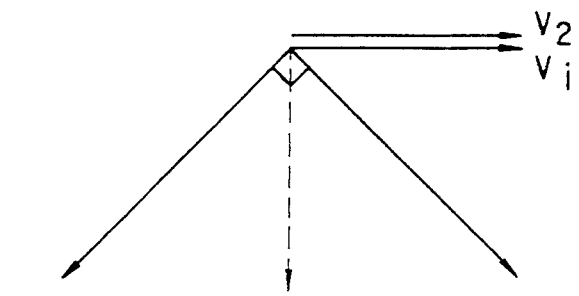
FIG. 11 is an amplitude control vectrial diagram in the circuit shown in FIG. 2.

The input signal $V_i$ is supplied to a variable delay unit 18 and from there to a phase detector 19 where the output signal of the variable delay circuit unit 18 and input signal $V_i$ are compared at their phases. In order for the phase of the output signal $V_1$ of the variable delay unit 18 to be 90° delayed relative to the input signal $V_i$, the delay time is controlled by the phase detector 19. The signal $V_1$ and output signal $V_2$ of the variable amplifier 16 are supplied to a phase detector 20 and the variable delay unit 15 is so controlled by the output of the phase detector 20 as to make the phase of the signal $V_1$ 90° delayed relative to the signal $V_2$. By so doing it is possible to match the phase of the input signal $V_i$ to that of the signal $V_2$ as shown in FIG. 10. The signals $V_1$ and $V_2$ are supplied to an adder 21 and subtracter 22. A sum signal $V_3$ from the adder 21 and difference signal $V_4$ from the subtracter 22 are supplied to a phase detector 23. The output signal $V_2$ of the variable amplifier 16 has its amplitude controlled by the output of the phase detector 23. As a result, the amplitudes of these signals $V_1$ and $V_2$ are matched as shown in FIG. 11 and, with a gain of the variable delay unit 18 given as 0 dB, the input signal $V_i$ and signal $V_2$ can be matched at their amplitudes.

In FIG. 2, CCD 13 constitutes an external component part. The subtracter 11, adder 12, filter circuit 14, variable delay unit 15, variable amplifier 16, limiter 17, variable delay unit 18, phase detectors 19, 20 and 23, adder 21, subtracter 22, etc., are provided as an integrated circuit device.

FIG. 3 shows the filter circuit 14 having a circuit arrangement as shown in FIG. 2. The filter circuit 14 comprises a bandpass filter 14-1, low-pass filter 14-2 and low-pass filter 14-3. The bandpass filter 14-1 comprises, as shown, for example, in FIG. 4, transconductance amplifiers 24 and 25, buffer amplifier 26, voltage divider 27 and capacitors 28 and 29. Through the capacitive coupling of the capacitor 28, the input signal from CCD 13 is supplied to a non-inverting input terminal of the amplifier 25. The output of the amplifier 25 is supplied to the input terminal of the amplifier 26. The capacitor 29 is connected between the output terminal of the amplifier 25 and ground. The output of the amplifier 25 is fed to the low-pass filter 14-2 and back to an inverting input terminal of the amplifier 24. The noninverting input terminal of the amplifier 24 is grounded and the output of the amplifier 24 is supplied to the noninverting input terminal of the amplifier 25. The output of the amplifier 24 is supplied to the noninverting input terminal of the amplifier 25. The voltage divider 27 is connected between the output terminal of the amplifier 26 and the inverting input terminal of the amplifier 25.

The low-pass filters 14-2 and 14-3, each, comprise transconductance amplifiers 30, 31, buffer amplifiers 32 and capacitors 33 and 34 as shown, for example, in FIG. 5. The output signal of the bandpass filter 14-1 or low-pass filter 14-2 is supplied to a noninverting input terminal of the amplifier 30. The output signal of the amplifier 30 is supplied to the noninverting input terminal of the amplifier 31. The capacitor 33 is connected across the output terminal of the amplifier 30 and ground. The output signal of the amplifier 31 is supplied to the amplifier 32. The capacitor 34 is connected across the output terminal of the amplifier 31 and ground. The output signal of the amplifier 32 is fed to the low-pass filter 14-3 or variable delay unit 15 and back to the noninverting input terminals of the amplifiers 30 and 31.

Those unnecessary signal components, such as clock signals contained in the output signal of CCD 13 and used for data shift, are eliminated by the filter circuit 14 having the bandpass filter 14-1, low-pass filter 14-2 and lower pass filter 14-3. A one horizontal period-delayed replica of the input signal $V_i$ is supplied to the variable delay unit 15.

FIG. 6 shows one form of the variable delay unit 18 in the circuit shown in FIG. 2. The variable delay unit 18 comprises transconductance amplifiers 35, 36, buffer amplifiers 37, 38, amplifier 39, dividers 40, 41, adder 42 and capacitors 43, 44. The input signal $V_i$ is supplied to the noninverting input terminal of the amplifier 35 and the input terminals of the amplifier 39 and voltage divider 40. The output of the amplifier 35 is supplied to the noninverting input terminal of the amplifier 36. The capacitor 44 is connected between the output terminal of the amplifier 35 and ground. The output of the amplifier 36 is supplied to the input terminal of the amplifier 37. The capacitor 43 is connected between the output terminal of the amplifier 39 and that of the amplifier 36. The amplifier provides an output signal $V_1$. The output signal $V_1$ is fed back to the inverting input terminal of the amplifier and to the divider 41. The outputs of the voltage dividers 40 and 41 are supplied to the amplifier 42 where they are added together. A resultant sum signal is supplied to the inverting terminal of the amplifier 36 through the amplifier 38.

The output signal of the phase detector 19 is supplied to the transconductance amplifiers 35 and 36 where a corresponding mutual conductance is controlled. By so doing, the phase of the output $V_1$ is so controlled as to make it 90°-delayed relative to the input signal $V_i$.

Figure 18:
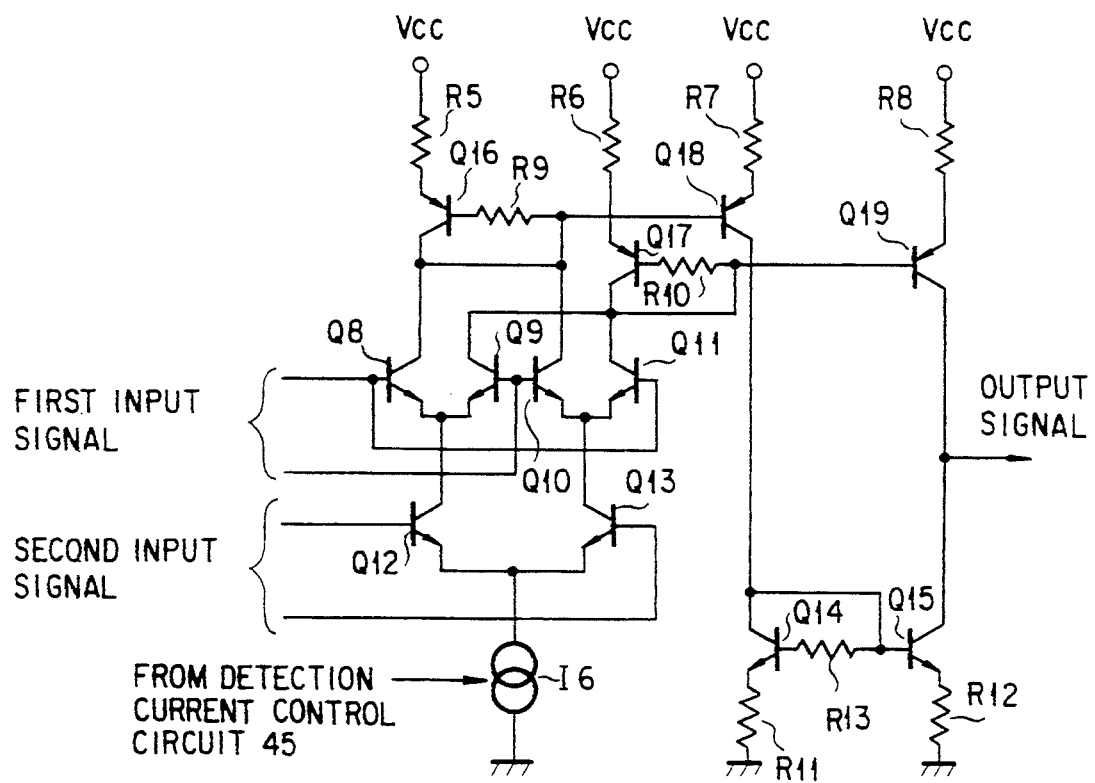
FIG. 18 is a circuit showing a schematic form of a phase detector in the circuit shown in FIG. 18.

The variable delay unit 15 is also of such a type that it has substantially the same arrangement as that of the variable delay unit 18 as shown in FIG. 18. For the variable delay unit 15, it is only necessary to control mutual conductance by supplying the output signal of the phase detector 20 to the transconductance amplifiers 35 and 36 in FIG. 6. In this way, the output signal $V_1$ of the variable delay unit 18 is so controlled as to have its phase 90°-delayed relative to the output signal $V_2$ of the variable amplifier 16.

FIG. 7 shows one circuit form of the variable amplifier 16 in the circuit shown in FIG. 2. The variable amplifier 16 comprises NPN type bipolar transistors Q1 to Q7, resistors R1 to R4, current sources I1 to I5 and base-biasing DC current sources B1 and B2. The transistors Q1 and Q2 are connected at their collectors to a power supply Vcc and at their bases to the DC current source B1. The collectors of the transistors Q3 and Q4 are connected to the emitters of the transistors Q1 and Q2 and the bases of the transistors Q5 and Q6 are connected to the transistors Q1 and Q2, respectively. The base of the transistor Q3 is connected to the DC current source I2 for biasing and the emitter of the transistor Q3 is connected to one end of the resistor R1. The output of the variable delay unit 15 is supplied to the base of the transistor Q4 and the emitter of the transistor Q4 is connected to one end of the resistor R2. The other end of the resistor R1 and that of the resistor R2 are connected together to provide a common connection junction. The current source I1 is connected between the common connection junction and ground. The current source I2 is connected between the emitter of the transistor Q3 and ground and the current source I3 is connected between the emitter of the transistor Q4 and ground. These current sources I2 and I3 are controlled by the output of the phase detector 23.

The resistor R3 is connected across the collector of the transistor Q5 and power supply Vcc and the resistor R4 across the collector of the transistor Q6 and the power supply Vcc. The emitters of the transistors Q5 and Q6 are connected together to provide a common connection junction. The current source I4 is connected between the emitter common connection junction and ground. The transistor Q7 is connected at its base to the collector of the transistor Q6 and at its collector to the power supply Vcc. The current source I5 is connected between the emitter of the transistor Q7 and ground and an output signal $V_2$ is taken out from the emitter of the transistor Q7.

In the arrangement as set out above, the transistors Q1 to Q4, resistors R1 and R2 and current sources I1 to I3 serve as a first-stage amplifier for comparing a signal supplied from the variable delay unit 15 to a bias voltage signal for a differential amplification to be carried out. The first-stage amplifier is such that the amplitude of the output signal is controlled by controlling an amount of current through the current sources I2 and I3 by the output of the phase detector 23. The output signal of the first-stage amplifier is amplified by a second-stage amplifier comprising the transistors Q5, Q6, resistors R3, R4 and current source I4 and an output signal $V_2$ of an output circuit comprising the transistor Q7 and current source I5 is supplied to the adder 12, phase detector 20, adder 21 and subtracter 22.

FIG. 8 shows one form of a circuit arrangement of the phase detectors 19, 20 and 23 in the circuit shown in FIG. 2. These phase detectors, each, comprise NPN type bipolar transistors Q8 to Q15, PNP type bipolar transistors Q16 to Q19, resistors R5 to R13 and current source I6. A first input signal is supplied to the bases of the transistors Q8 and Q9 and to the bases of the transistors Q11 and Q10. The collector of the transistor Q12 is connected to the emitters of the transistors Q8 and Q9, the collector of the transistor Q13 is connected to the emitters of the transistors Q10 and Q11 and a second input signal is supplied to the bases of the transistors Q12 and Q13. The emitters of the transistors Q12 and Q13 are connected together to provide a common connection junction and the current source I6 is connected between the emitter connection junction and ground. The collector of the transistor Q8 is connected to the collector of the transistor Q16 and the collector of the transistor Q11 is connected to the collector of the transistor Q17. The resistor R5 is connected between the emitter of the transistor Q16 and power supply Vcc and one end of the resistor R9 is connected to the base of the transistor Q16. The other end of the resistor R9 is connected to the collectors of the transistors Q8 and Q10 and base of the transistor Q18. The resistor R6 is connected between the emitter of the transistor Q17 and the power supply Vcc and the other end of the resistor R10 is connected to the collectors of the transistors Q9 and Q11 and to the base of the transistor Q19. The resistors R7 and R8 are connected between the power supply Vcc and the emitters of transistors Q18 and Q19. The collector of the transistor Q14 and base of the transistor Q15 are connected to the collector of the transistor Q18 and the collector of the transistor Q15 is connected to the collector of the transistor Q19. The resistor R11 is connected between the emitter of the transistor Q14 and ground, the resistor R12 between the emitter of the transistor Q15 and ground, and the resistor R13 between the bases of these transistors Q14 and Q15. An output is taken from a common collector connection point between the transistors Q19 and Q15.

The phase detector as shown in FIG. 8 basically constitutes a multiplier and delivers an output signal as a zero level signal when the second input signal is 90°-delayed or -advanced relative to the phase of the first input signal.

In the case where the circuit as shown in FIG. 8 is comprised of the phase detector 19, the input signal $V_i$ is supplied as the first input signal to the phase detector and the output signal $V_1$ of the variable delay unit 18 is supplied to the phase detector. The output of the phase detector is supplied to the variable delay unit 18. In the case where the circuit as shown in FIG. 8 is comprised of the phase detector 20, the output signal $V_2$ of the variable amplifier 16 is supplied as the first input signal to the phase detector 20 and the output signal $V_1$ of the variable delay unit 18 is supplied as the second input signal to the phase detector 20. The output signal of the phase detector 20 is supplied to the variable delay unit 15. In the case where the circuit as shown in FIG. 8 is comprised of the phase detector 23, the output signal $V_4$ of the subtracter 22 is supplied as the first signal to the phase detector 23 and the output signal $V_3$ of the adder 21 is supplied as the second input signal to the phase detector 23. The output signal of the phase detector 23 is supplied to the variable amplifier 16.

FIG. 9 shows one form of a circuit configuration of the adder 21 and subtracter 22 in the circuit shown in FIG. 2. As shown in FIG. 9, the circuit comprises NPN type bipolar transistors Q20 to Q33, PNP type bipolar transistors Q34 and Q35, resistors R14 to R25, current sources I7 to I14, and base-biasing DC power supplies B3 and B4. The output signal $V_1$ of the variable delay unit 18 is supplied to the bases of the transistors Q20 and Q23 and the output signal $V_2$ of the variable amplifier 16 is supplied to the bases of the transistors Q24 and Q27. The bases of the transistors Q21 and Q22 are biased by the DC power supply B3 and the bases of the transistors Q25 and Q26 are biased by the DC power supply B4. The resistors R14 and R15 are connected, in series array, between the emitters of the transistors Q20 and Q21 and the current source I7 is connected between a connection junction of these resistors R14 and R15 and ground. The resistors R16 and R17 are connected, in series array, between the emitters of the transistors Q22 and Q23 and the current source I8 is connected between a connection junction of these resistors R16 and ground. The resistors R18 and R19 are connected, in series array, between the emitters of the transistors Q24 an Q25 and the current source I9 is connected between the connection junction of these resistors R18 and R19. The resistors R20 and R21 are connected, in series array, between the emitters of the transistors Q26 and Q27 and the current source I10 is connected between the connection junction of these resistors R20 and R21 and ground. The collectors of the transistors Q20 and Q26 are connected to one end of the resistor R24, collector and base of the transistor Q30, emitter of the transistor Q31 and base of the transistor Q35. The collectors of the transistors Q21 and Q27 are connected to one end of the resistor R25, emitter of the transistor Q30, collector and base of the transistor Q31 and base of the transistor Q34.

The collectors of the transistors Q22 and Q25 are connected to one end of the resistor R23, emitter of the transistor Q28, collector and base of the transistor Q29 and base of the transistor Q32. The collectors of the transistors Q23 and Q24 are connected to one end of the resistor R22, collector and base of the transistor Q28, emitter of the transistor Q29 and base of the transistor Q33. The other end of each of the resistors R22 to R25 is connected to the power supply Vcc. The collectors of the transistors Q34 and Q35 are grounded and the current source I11 is connected between the emitter of the transistor Q34 and the power supply Vcc and the current source I12 is connected between the emitter of the transistor Q35 and the power supply Vcc. A subtractive output (difference signal) $V_4$ is obtained from the emitters of the transistors Q34 and Q35. The collectors of the transistors Q32 and Q33 are connected to the power supply Vcc an the current source I13 is connected between the emitter of the transistor Q32 and ground and the current source I14 is connected between the emitter of the transistor Q33 and ground. An additive output (sum signal) $V_3$ is taken from the emitters of the transistors Q32 and Q33. The subtractive output $V_4$ and additive output $V_3$ are supplied to the phase detector 23 whose circuit configuration is as shown in FIG. 8.

According to the circuit arrangement above, except for CCD 13 in the circuit shown in FIG. 2, the subtracter 11, adder 12, filter circuit 14, variable delay unit 15, variable amplifier 16, limiter 17, variable delay unit 18, phase detectors 19, 20 and 23, adder 21 and subtracter 22 are built as an integrated circuit device, thus reducing the number of external component parts involved. Less manufacturing steps and less occupation area can, therefore, be achieved upon the mounting of these component part on a printed circuit board. It is also possible to reduce the manufacturing costs. Further, the phase delay time of the variable delay unit 15 and amplitude of the variable amplifier 16 are automatically adjusted, thus eliminating the need to make any adjustment by the operator and hence reduce any manufacturing costs involved. Since the phase delay time of the variable delay unit 15 and amplitude of the variable amplifier 16 are continuously adjusted during the operation of the apparatus, a temperature variation and aging, if any, can automatically be carried out.

Figure 12:
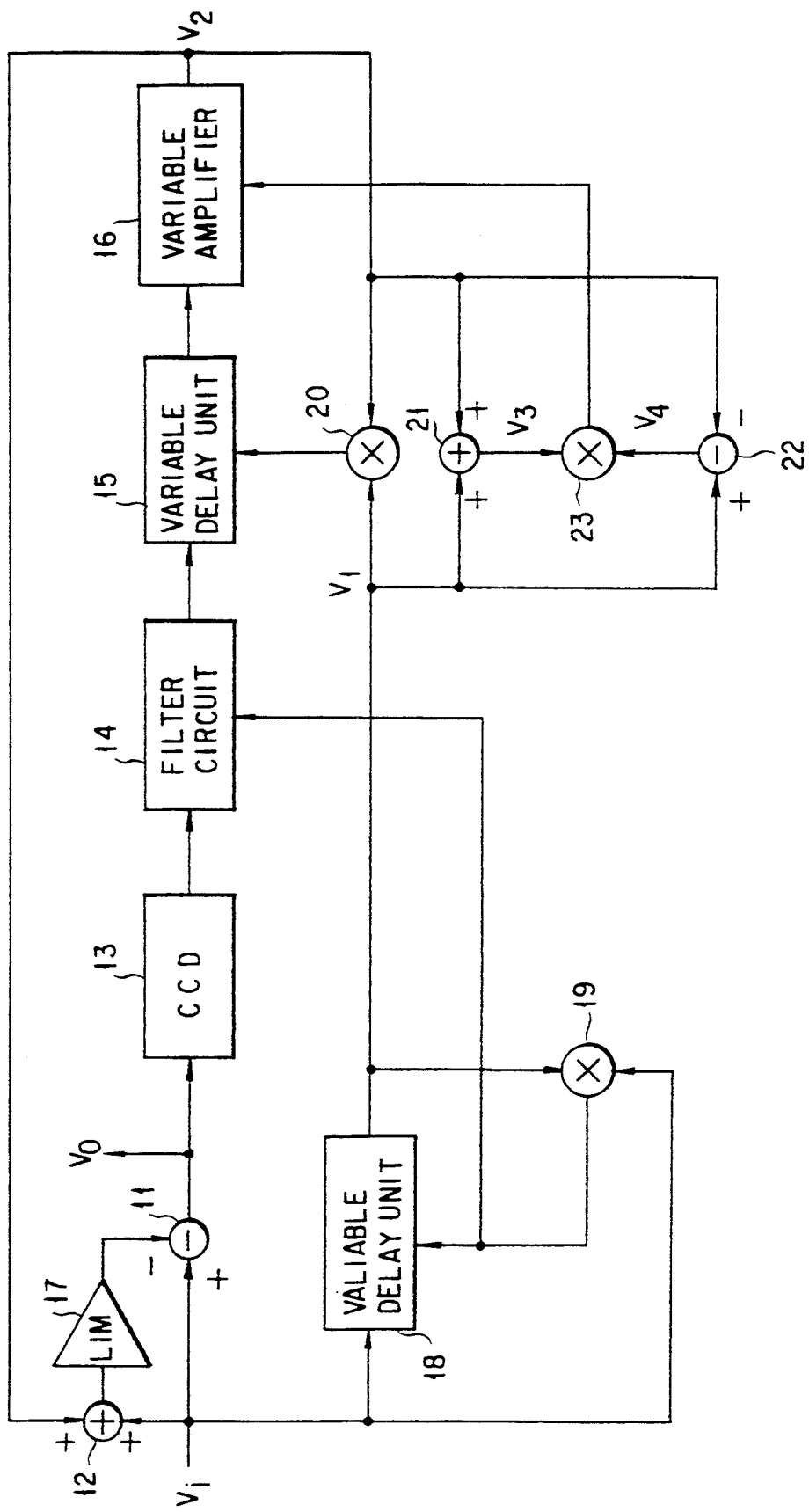
FIG. 12 is a block diagram showing a chroma noise reduction device according to a second embodiment of the present invention.

FIG. 12 is a block diagram showing a chroma noise reduction device according to a second embodiment of the present invention. In the second embodiment, a filter circuit 14 is further controlled by an output signal of a phase detector 19 in the circuit shown in FIG. 2.

Figure 13:
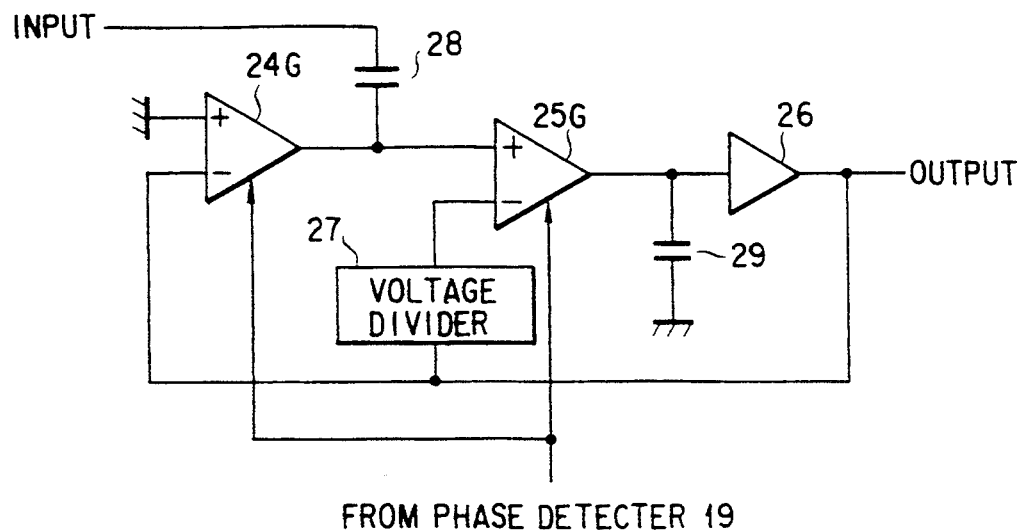
FIG. 13 is a block diagram showing a schematic form of a bandpass filter in a filter circuit of the device in FIG. 12.
Figure 14:
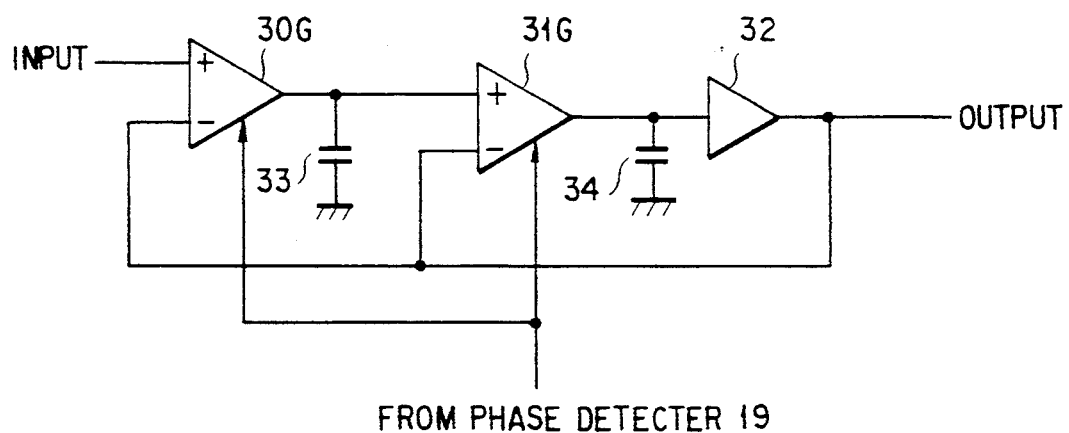
FIG. 14 is a block diagram showing a schematic form of a low-pass filter in a filter circuit in FIG. 12.

The filter circuit 14 comprises, as shown in FIG. 3, a bandpass filter 14-1 and low-pass filter 14-2 and 14-3. Although a basic circuit arrangement as shown in FIG. 13 is of the same type as shown in FIG. 4, the bandpass filter 14-1 controls the mutual conductance of transconductance amplifiers 24G and 25G by an output signal of the phase detector 19. Although a basic circuit arrangement as shown in FIG. 14 is of the same type as shown in FIG. 5, there is a difference in that the low-pass filters 14-2 and 14-3 control the mutual conductance of transconductance amplifiers 30G and 31G by the output signal of the phase detector 19.

In the second embodiment, a variable delay unit 18 is used to 90°-delay the phase of an input signal $V_i$ and, like the first embodiment, a delayed output and input signal $V_i$ have their phases detected by the variable delay unit 18 and an amount of delay by the variable delay unit 18 is so controlled as to obtain a 90° exactly.

The amount of delay by the variable delay unit 18 is set to be constant relative to the input signal (chroma signal) $V_i$ depending upon a variation among integrated circuits manufactured. By controlling, with a phase detection output, the filter circuit 14 whose configuration is of such a type as the variable delay unit 18, it is possible to automatically control the characteristic variation of the filter circuit 14 resulting from a variation among integrated circuits manufactured.

According to such a circuit configuration, therefore, the cutoff frequency characteristic of the filter circuit 14 is controlled as in the case of a variable delay unit 18 to secure a matching. It is possible to correct a displacement in the characteristic of the filter circuit 14 resulting from a variation among those integrated circuit elements and to stabilize the characteristic of the filter circuit 14.

Figure 15:
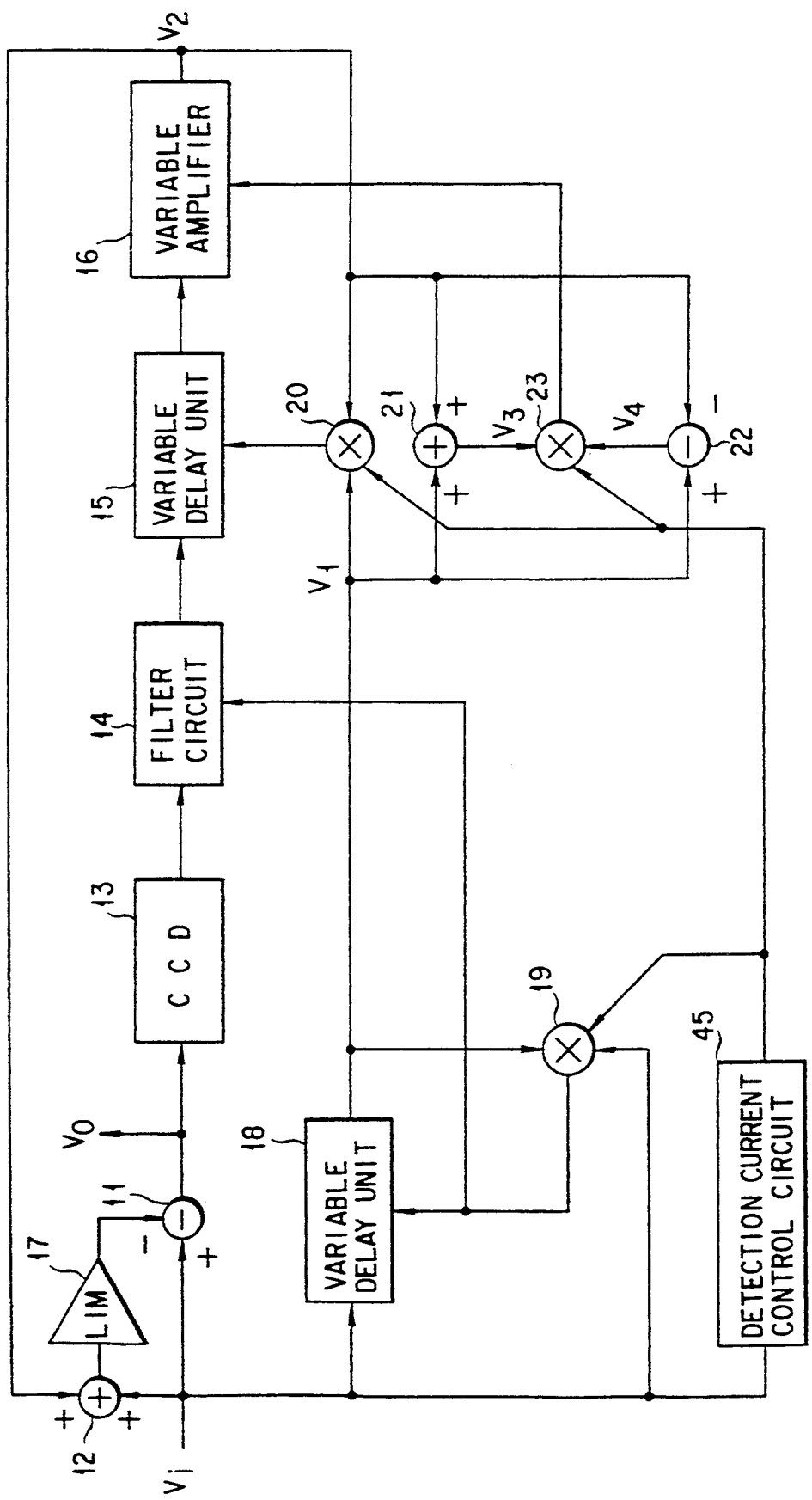
FIG. 15 is a block diagram showing a chroma noise reduction device according to a third embodiment of the present invention.

FIGS. 15 to 18 show a chroma noise reduction device according to a third embodiment of the present invention. FIG. 15 is a block diagram showing a diagrammatic circuit arrangement of the device, FIG. 16 is a circuit arrangement showing one form of a detection current control circuit in FIG. 15, FIGS. 17A, 17B and 17C are waveform diagrams of those signals in the circuit shown in FIG. 16 and FIG. 18 is a circuit diagram showing a practical form of each phase detector. The third embodiment adds a detection current control circuit 45 to the circuit shown in FIG. 12. An input signal $V_i$ is supplied to the detection current control circuit 45, the output of which is supplied to respective phase detectors 19, 20 and 23 for control. Chroma noise reduction processing is manually controlled on a conventional device through the use of external component parts, because a high precision phase detector is necessary when those component parts are built as an integrated circuit device. According to the present invention, however, the above arrangement is adopted instead to eliminate this situation encounted on the conventional apparatus when the input signal (chroma signal) $V_i$ is at a low level, the detection current control circuit 45 serves to prevent occurrence of an output error resulting from an offset current, etc., of the phase detectors 19, 20 and 23. That is, although the transistors Q8 and Q13 in the phase detector shown in FIG. 8 are set in a balanced state, if that balance state is broken due to a variation, etc., among the elements, an offset current is induced and an error current is produced when a detection current is not a zero. Stated in more detail, when any offset current $\Delta i$ is produced in the phase detector, for example, an input signal containing only a burst signal is supplied, a displacement $\Delta i$ is produced during the time period in which there is no signal between the burst signals, that is, during the time period of about 60 μsec., provided that the burst signal period is given as 4 μsec. With the output of a burst period given by i, the average value of the outputs becomes:

$$4i/64 + 60\Delta i/64$$

From this it follows that there occurs a displacement from a correct output i. In the third embodiment, the respective phase detectors 19, 20 and 23 have their operations controlled by the detection current control circuit 45 and, when the input signal $V_i$ is at a low level, the outputs of the respective phase detectors 19, 20 and 23 are made zeroes.

FIG. 16 shows one form of the detection current control circuit 45. This control circuit comprises NPN type bipolar transistors Q36 to Q53, PNP type bipolar transistors Q54 and Q55, resistors R26 to R40, current sources I15 to I22, base-biasing power supply B5 and capacitors C1 to C3.

The base of the transistor Q36 is biased by the power supply B5 and an input signal $V_i$ is supplied to the base of the transistor A37. The collectors of the transistors Q36 and Q37 are connected to a power supply Vcc and the resistors R26 and R27 are connected to the emitters of the transistors Q36 and Q37, respectively. The collectors and bases of the transistors Q38 and Q39 are connected to the other end sides of the resistors R26 and R27, respectively, and the current sources I15 and I16 are connected one between the emitter of the transistor Q38 and ground and one between the emitter of the transistor Q39 and ground. The emitter of the transistor Q36 is connected to the bases of the transistors Q41 and Q43 and the emitter of the transistor Q37 is connected to the bases of the transistors Q40 and Q42. A resistor R30 is connected between the collector of the transistor Q40 and the power supply Vcc and the emitter of the transistor Q40 is connected to one end of the resistor R28 and to the collector of the transistor Q44. The resistor R31 is connected between the collector of the transistor Q41 and the power supply Vcc and the emitter of the transistor Q41 is connected to the other end of the resistor R28. The collector of the transistor Q42 is connected to the collector of the transistor Q42 and base of the transistor Q46 and the emitter of the transistor Q42 is connected to one end of the resistor R29. The collector of the transistor Q43 is connected to the collector of the transistor Q40 and base to the transistor Q47 and the emitter of the transistor Q43 is connected to the other end of the resistor R29 and collector of the transistor Q45. The base of the transistor Q44 is connected to the emitter of the transistor Q38 and the base of the transistor Q45 is connected to the emitter of the transistor Q39. The emitter of the transistor Q44 and that of the transistor Q45 are connected together to provide a common connection junction. The current source I17 is connected between the common connection junction and the ground. The collectors of the transistors Q46 and Q47 are connected to the power supply Vcc and the current source I18 is connected between the emitter of the transistor Q46 and ground and the current source I19 is connected between the emitter of the transistor Q47 and ground. The emitter of the transistor Q46 is connected via the resistors R32 and R33 to the base of the transistor Q48 and the emitter of the transistor Q47 is connected via the resistors R34 and R35 to the base of the transistor Q49. The collector of the transistor Q49 is connected to the power supply Vcc and the current source I20 is provided between the emitter of the transistor Q49 and ground. The collector of the transistor Q48 is connected to the power supply Vcc and the current source I21 is provided between the emitter of the transistor Q48 and ground. The capacitor C1 is connected between the connection junction of the resistors R32 and R33 and the emitter of the transistor Q48 and the capacitor C2 is connected between the connection junction of the resistors R34 and R35 and the emitter of the transistor Q49. The capacitor C3 is connected between the bases of the transistors Q48 and Q49. The base of the transistor Q50 is connected to the emitter of the transistor Q48 and the collector of the transistor Q50 is connected to the power supply Vcc. The base of the transistor Q51 is connected to the emitter of the transistor Q49 and the collector of the transistor Q51 is connected to the collector of the transistor Q54 and base of the transistor Q55. The emitters of the transistors Q50 and Q51 are connected together to provide a common connection junction and the current source I22 is provided between the common connection junction and ground. The bases of the transistors Q54 and Q55 are connected together via the transistor R36 and the resistor R37 is connected between the emitter of the transistor Q54 and the power supply Vcc and the resistor R38 is connected between the emitter of the transistor Q55 and the power supply Vcc. The collector of the transistor Q55 is connected to the collector of the transistor Q52 and base of the transistor Q53. The base of the transistor Q52 is connected to the emitter of the transistor Q53 and the resistor R39 is connected between the emitter of the transistor Q52 and ground. The collector of the transistor Q53 is connected to the power supply Vcc and the resistor R40 is connected between the emitter of the transistor Q53 and ground. An output signal of the detection current control circuit 45 is obtained from the emitter of the transistor Q53.

An NPN type bipolar transistor Q56 and resistor R41 are provided so as to provide the output signal of the detection current control circuit 45 to the respective phase detectors 19, 20 and 23. The emitter of the transistor Q53 is connected to the base of the transistor Q56 and a resistor R41 is connected between the emitter of the transistor Q53 and ground. The collector of the transistor Q56 is connected to the detectors 19, 20 and 23.

In the arrangement above, the transistors Q36 to Q39, resistors R26 and R27, current sources I15 and I16, and DC power supply B5 act as an input circuit. The transistors Q40 to Q47, resistors R28 to R31 and current sources I17 to I19 constitute a full-wave detection circuit. The transistors Q48 and Q49, resistors R32 to R35, capacitors C1 to C3 and current sources I20 and I21 constitute a low-pass filter. Further, the transistors Q50 to Q55, resistors R36 to R40 and current source I22 serve as an output circuit.

FIG. 18 shows a practical circuit arrangement of the phase detectors 19, 20 and 23 controlled by the detection current control circuit 45. The control circuit is basically of the same type as shown in FIG. 8 and the same reference numerals are employed to designate parts or elements corresponding to those shown in FIG. 8. Therefore, any further explanation is, therefore, omitted. The current source I6 is controlled by the output signal of the detection current control circuit 45.

Figure 17A:
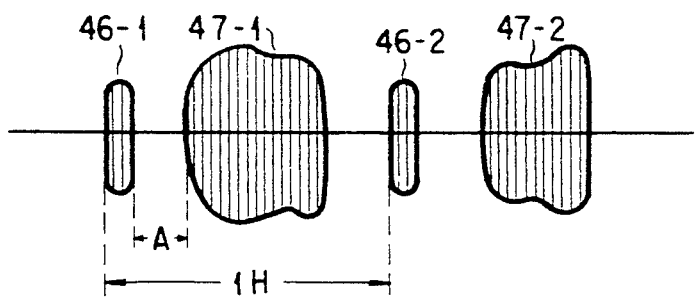
FIG. 17A is a waveform diagram showing nodes emerging in the circuit shown in FIG. 16.
Figure 17B:
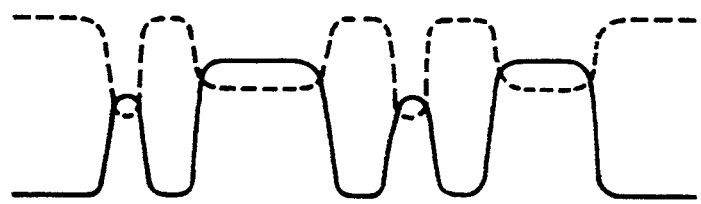
FIG. 17B is a waveform diagram showing nodes emerging in the circuit shown in FIG. 16.
Figure 17C:
FIG. 17C is a waveform diagram showing nodes emerging in the circuit shown in FIG. 16.

The operation of the above arrangement will be explained below. An input signal $V_i$ as shown in FIG. 17A is supplied to the detection current control circuit 45. The input signal $V_i$ contains burst signals 46-1, 46-2, . . . and chroma signals 47-1, 47-2, . . . , and an interval between the burst signal 46-1 and the burst signal 46-2 corresponds to one horizontal period (1H). The interval A between the burst signal 46-1 and the chroma signal 47-1, interval between the chroma signal 47-1 and the burst signal 46-2, interval between the burst signal 46-2 and the chroma signal 47-2, . . . , constitute a "no-signal" period, respectively. FIG. 17B shows an output signal of the low-pass filter in the detection current control circuit 45, noting that the solid line shows the waveform of a signal supplied to the base of the transistor Q51 and the broken line, the waveform of a signal supplied to the base of the transistor Q50. FIG. 17C shows an output waveform, that is, a signal waveform supplied from the emitter of the transistor Q53 to the base of the transistor Q56.

In the above-mentioned arrangement, when the input signal $V_i$ is supplied to the full-wave detection circuit through the input circuit of the detection current control circuit 45, the chroma signal contained in the input signal $V_i$ is full-wave detected by the full-wave detection circuit. This signal is passed through the low-pass filter to obtain a corresponding chroma signal. The current in the current source I6 of the phase detectors 19, 20 and 23 is controlled by the obtained chroma signal's envelope. By so doing, the output signals of the phase detectors 19, 20 and 23 are made zeroes at the time period A shown in FIG. 17A, that is, at those burst and chroma signal periods between which the input signal is made zero.

According to the third embodiment, even if any offset current is produced in the phase detectors 19, 20 and 23 due to a variation among those integrated circuits manufactured, etc., the detection current in the current source I6 becomes zero when an input current is small. It is, therefore, possible to reduce an output error at the output of the phase detectors 19, 20 and 23.

According to the present invention, as explained above, a chroma noise reduction device can be obtained which can reduce its manufacturing costs and cope with a variation in temperature and aging.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A chroma noise reduction device comprising:
   1H delay means for delaying a signal by an amount corresponding to one horizontal period;
   variable delay means for adjusting a phase difference between a delay signal from the 1H delay means and an input signal;
   variable amplifying means for adjusting an amplitude of the delay signal from the 1H delay means to an amplitude of the input signal;
   first adding means for adding an output signal of the variable amplifying means and input signal;
   amplitude restricting means for restricting an amplitude of an output signal from the first adding means;
   first subtracting means for subtracting an output signal of the amplitude restricting means from the input signal and for supplying a resultant subtraction signal to the 1H delay means;
   second variable delay means for 90°-delaying the phase of the input signal;
   first phase detecting means for comparing the phases of a delay signal output from the second variable delay means and input signal and for controlling the second variable delay means in response to a resultant comparison output to make the phase of the input signal 90°-delayed;
   second phase detecting means for comparing the phases of the output signal of the second variable delay means and output signal of the variable amplifying means and for controlling a phase delay by the first variable delay means in accordance with a resultant comparison output to make the output signal of the second variable delay means 90°-delayed relative to the phase of the output signal of the variable amplifying means;

second adding means for adding the output signal of the second variable delay means and output signal of the variable amplifying means;

second subtracting the output signal of the variable amplifying means from the output signal of the second variable delay means; and third phase detecting means for comparing the phases of an addition signal output from the second adding means and subtraction signal output from the second subtracting means and for controlling the variable amplifying means in response to a resultant comparison output.

2. The chroma noise reduction device according to claim 1, wherein the 1H delay means comprises a CCD for delaying an output signal of the first subtracting means by an amount corresponding to one horizontal period and filter means for eliminating a clock signal contained in the output signal of the CCD.

3. The chroma noise reduction device according to claim 1, wherein the first variable delay means includes transconductance amplifier means for having a mutual conductance controlled by the output of the second phase detecting means and the second variable delay means includes transconductance amplifier means for having a mutual conductance controlled by the output of the first phase detecting means.

4. The chroma noise reduction device according to claim 1, wherein the variable amplifying means includes a comparator for comparing the output signal of the first variable delay means and a reference potential and current source means of the comparator is controlled by the output signal of the third phase detecting means.

5. A chroma noise reduction device comprising:

1H delay means for delaying a signal by an amount corresponding to one horizontal period;

filter means for eliminating a signal component other than an input signal contained in an output signal of the 1H delay means;

first variable delay means for adjusting a phase difference between a delay signal output from the filter means and the input signal;

variable amplifying means for adjusting an amplitude of the delay signal of the 1H delay means to an amplitude of the input signal;

first adding means for adding the output signal of the variable amplifying means and input signal;

amplitude restricting means for restricting the amplitude of the output signal of the first adding means;

first subtracting means for subtracting an output signal of the amplitude restricting means from the input signal and for supplying a resultant subtraction signal to the 1H delay means;

second variable delay means for 90°-delaying the phase of the input signal;

first phase detecting means for comparing the phases of the delay signal output from the second variable delay means and input signal and for controlling the second variable delay means in response to a comparison output to make the phase of the input signal 90°-delayed and controlling the filter means;

second phase detecting means for comparing the phases of the output signal of the second variable delay means and output signal of the variable amplifying means and for controlling the phase delay by the first variable delay means in response to a resultant comparison output to make the output signal of the second variable delay means 90°-delayed relative to the phase of the output signal of the variable amplifying means;

second adding means for adding the output signal of the second variable delay means and output signal of the variable amplifying means;

second subtracting means for subtracting the output signal of the variable amplifying means from the output signal of the second variable delay means; and third phase detecting means for comparing the phases of an addition signal output from the second adding means and subtraction signal output from the second subtracting means and for controlling the variable amplifying means in response to a comparison output.

6. The chroma noise reduction device according to claim 5, wherein the 1H delay means includes a CCD for delaying the output signal of the first subtracting means by an amount corresponding to one horizontal period.

7. The chroma noise reduction device according to claim 5, wherein the filter means includes transconductance amplifiers for having a mutual conductance controlled by the output of the first phase detecting means.

8. The chroma noise reduction device according to claim 5, wherein the first variable delay means includes transconductance amplifying means for having a mutual conductance controlled by the output of the second phase detecting means and the second variable delay means for having a mutual conductance controlled by the output of the first phase detecting means.

9. The chroma noise reduction device according to claim 5, wherein the variable amplifying means includes a comparator for comparing the output signal of the first variable delay means to a reference potential and current source means of the comparator is controlled by the output signal of the third phase detecting means.

10. A chroma noise reduction device comparing:

1H delay means for delaying a signal by an amount corresponding to one horizontal period;

first variable delay means for adjusting a phase difference between a delay signal from the 1H delay means and an input signal;

variable amplifying means for adjusting an amplitude of the delay signal from the 1H delay means to an amplitude of the input signal;

first adding means for adding the output signal of the variable amplifying means and input signal;

amplitude restricting means for restricting the amplitude of the output signal of the first adding means;

first subtracting means for subtracting an output signal of the amplitude restricting means from the input signal and for supplying a resultant subtraction signal to the 1H delay means;

second variable delay means for 90°-delaying the phase of the input signal;

first phase detecting means for comparing the phases of a delay signal output from the second variable delay means and input signal and for controlling the second variable delay means in response to a resultant comparison output to make the phase of the input signal 90°-delayed;

second phase detecting means for comparing the phases of an output signal of the second variable delay means and output signal of the variable amplifying means and for controlling a phase delay by the first variable delay means in response to a resultant comparison output to make the output signal of the second variable delay means 90°-delayed relative to the phase of the output signal of the variable amplifying means;

second adding means for adding the output signal of the second variable delay means and output signal of the variable amplifying means;

second subtracting means for subtracting the output signal of the variable amplifying means from the output signal of the second variable delay means;

third phase detecting means for comparing the phases of an addition signal output from the second adding means and subtraction signal output from the second subtracting means and for controlling the variable amplifying means in response to a resultant comparison output; and detection current control means for receiving the input signal and for controlling the first, second and third phase detecting means.

11. The chroma noise reduction device according to claim 10, wherein the 1H delay means includes a CCD for delaying the output signal of the first subtracting means by an amount corresponding to one horizontal period and filter means for eliminating a clock signal contained in the output signal of the CCD.

12. The chroma noise reduction device according to claim 11, wherein the filter means includes transconductance amplifier means for having a mutual conductance controlled by the output of the first phase detecting means.

13. The chroma noise reduction device according to claim 10, wherein the first variable delay means includes transconductance amplifier means for having a mutual conductance controlled by the output of the second phase detecting means and the second variable delay means includes transconductance amplifier means for having a mutual conductance controlled by the output of the first phase detecting means.

14. The chroma noise reduction device according to claim 10, wherein the variable amplifying means includes a comparator for comparing the output signal of the first variable delay means to a reference potential and current source means of the comparator is controlled by the output signal of the third phase detecting means.

15. The chroma noise reduction device according to claim 10, wherein the first, second and third phase detecting means, each, include a comparator for comparing two input signals and current source means of the comparator is controlled by the detection current control means.

16. The chroma noise reduction device according to claim 10, wherein the detection current control means includes full-wave detecting means for full wave-detecting the input signal and a low-pass filter for receiving the output signal of the full wave-detecting means and, during a time period in which there is no input signal, the outputs of the first, second and third phase detecting means are made zeroes.

17. A chroma noise reduction device comprising:
an 1H delay element for delaying a signal by an amount corresponding to one horizontal period;
a first variable delay unit for adjusting a phase difference between a delay signal from the 1H delay element and an input signal;
a variable amplifier for adjusting an amplitude of the delay signal from the 1H delay element to an amplitude of the input signal;
a first adder for adding an output signal of the variable amplifier and input signal;
an amplitude restricting circuit for restricting the amplitude of an out put signal of the first adder;
a first subtracter for subtracting an output signal of the amplitude restricting circuit from the input signal and for supplying a subtraction signal to the 1H delay element;
a second variable delay unit for 90°-delaying the phase of the input signal;
a first phase detector for comparing the phases of a delay signal output from the second variable delay unit and input signal and for controlling the second variable delay unit in response to a comparison output to make the phase of the input signal 90°-delayed;
a second phase detector for comparing the phases of an output signal of the second variable delay unit and output signal of the variable amplifier and for controlling a phase delay by the first variable delay unit in response to a resultant comparison output to make the output signal of the second variable delay unit 90°-delayed relative to the phase of the output signal of the variable amplifier;
a second adder for adding the output signal of the second variable delay unit and output signal of the variable amplifier;
a second subtracter for subtracting the output signal of the variable amplifier from the output signal of the second variable delay unit; and
a third phase detector for comparing the phases of an addition signal output from the second adder and subtraction signal output from the second subtracter and for controlling the variable amplifier in response to a comparison output.

18. A chroma noise reduction device comprising:
a 1H delay element for delaying a signal by an amount corresponding to one horizontal period;
a filter circuit for eliminating a signal component other than an input signal contained in an output signal of the 1H delay element;
a first variable delay unit for adjusting a phase difference between a delay signal output from the filter circuit and the input signal;
a variable amplifier for adjusting the amplitude of the delay signal from the 1H delay element to an amplitude of the input signal;
a first adder for adding the output signal of the variable amplifier and input signal;
an amplitude restricting circuit for restricting the amplitude of an output signal of the first adder;
a first subtracter for supplying a subtraction signal to the 1H delay element;
a second variable delay unit for 90°-delaying the phase of the input signal;
a first phase detector for comparing the phases of a delay signal output from the second variable delay unit and input signal and for controlling the second variable delay unit in response to a resultant comparison output to make the phase of the input signal 90°-delayed and controlling the filter circuit;
a second phase detector for comparing the phases of the output signal of the second variable delay unit and output signal of the variable amplifier and for controlling the phase delay by the first variable delay unit in response to a resultant comparison output to make the output signal of the second variable delay unit 90°-delayed relative to the phase of the output signal of the variable amplifier;

a second adder for adding the output signal of the second variable delay unit and output signal of the variable amplifier;

a second subtracter for subtracting the output signal of the variable amplifier from the output signal of the second variable delay unit; and a third phase detector for comparing the phases of an addition signal output from the second adder and subtraction signal output from the second subtracter and for controlling the variable amplifier in response to a comparison output.

19. A chroma noise reduction device, comprising:

a 1H delay element for delaying a signal by an amount corresponding to one horizontal period;

a first variable delay unit for adjusting the phases of a delay signal from the 1H delay element and input signal;

a variable amplifier for adjusting the amplitude of the delay signal from the 1H delay element to an amplitude of the input signal;

a first adder for adding the output signal of the variable amplifier and input signal;

an amplitude restricting circuit for restricting the amplitude of an output signal of the first adder;

a first subtracter for subtracting an output signal of the amplitude restricting circuit from the input signal and for supplying a subtraction signal to the 1H delay element;

a second variable delay unit for 90°-delaying the phase of the input signal;

a first phase detector for comparing the phases of the delay signal output from the second variable delay unit and input signal and for controlling the second variable delay unit in response to a comparison output to make the phase of the input signal 90°-delayed;

a second phase detector for comparing the phases of the output signal of the second variable delay unit and output signal of the variable amplifier and for controlling a phase delay by the first variable delay unit in response to a resultant comparison output to make the output signal of the second variable delay unit 90°-delayed relative to the phase of the output signal of the variable amplifier;

a second adder for adding the output signal of the second variable delay unit and output signal of the variable amplifier;

a second subtracter for subtracting the output signal of the variable amplifier from the output signal of the second variable delay unit;

a third phase detector for comparing the phases of an addition signal output from the second adder and subtraction signal output from the second subtracter and for controlling the variable amplifier in response to a resultant comparison output; and a detection current control circuit for receiving the input signal and for controlling the first, second and third phase detectors.

* * * * *